US012805538B2

(12) United States Patent
Schacht et al.

(10) Patent No.: US 12,805,538 B2
(45) Date of Patent: Nov. 24, 2026

(54) WHOLE PRESSED COFFEE BERRY JUICE

(71) Applicant: The Coca-Cola Company, Atlanta, GA (US)

(72) Inventors: Raymond Schacht, Apopka, FL (US); Brenda Rudan, Mount Dora, FL (US); Hector M. Del Valle, Kissimmee, FL (US); Steve Allmon, Winter Garden, FL (US); Yu Fang, Wintermere, FL (US); Juan Carlos Motamayor Arias, Miami, FL (US); Laura Hess, Oviedo, FL (US); Marcelo Perez, Apopka, FL (US)

(73) Assignee: The Coca-Cola Company, Atlanta, GA (US)

( * ) Notice: Subject to any disclaimer, the term of this patent is extended or adjusted under 35 U.S.C. 154(b) by 793 days.

(21) Appl. No.: 17/761,690

(22) PCT Filed: Sep. 18, 2020

(86) PCT No.: PCT/US2020/051504
§ 371 (c)(1),
(2) Date: Mar. 18, 2022

(87) PCT Pub. No.: WO2021/055757
PCT Pub. Date: Mar. 25, 2021

(65) Prior Publication Data

US 2022/0394992 A1 Dec. 15, 2022

Related U.S. Application Data

(60) Provisional application No. 62/902,053, filed on Sep. 18, 2019.

(51) Int. Cl.
*A23F 5/02* (2006.01)
*A23B 2/05* (2025.01)
(Continued)

(52) U.S. Cl.
CPC .................. *A23F 5/02* (2013.01); *A23B 2/05* (2025.01); *A23L 2/06* (2013.01); *A23L 2/68* (2013.01); *A23L 2/70* (2013.01); *A23N 1/02* (2013.01)

(58) Field of Classification Search
CPC .................................... A23F 5/02; A23L 2/06
See application file for complete search history.

(56) References Cited

U.S. PATENT DOCUMENTS 6,572,915 B1 6/2003 Drunen et al.
8,420,141 B2 4/2013 Roy et al.
(Continued)

FOREIGN PATENT DOCUMENTS

BE 1018194 A3 7/2010
BE 1018195 7/2010
(Continued)

OTHER PUBLICATIONS

"Novel Food Information—CoffeeBerry® whole fruit derivatives" https://www.canada.ca/en/health-canada/services/food-nutrition/genetically-modified-foods-other-novel-foods/approved-products/novel-food-information-coffeeberry-whole-coffee-fruit-derivatives.html May 4, 2017 (Year: 2017).*
(Continued)

*Primary Examiner* — Katherine D Leblanc
(74) *Attorney, Agent, or Firm* — Merchant & Gould P.C.

(57) ABSTRACT

The inventors have discovered that coffee berry juice, produced from whole coffee berries, can produce a distinct taste and chemical profile when compared to coffee and coffee berry extract products. The disclosed invention is directed to coffee berry juice products and methods of producing a coffee berry juice product. Especially preferred methods include use of whole coffee berries with increased concentrations of caffeine, chlorogenic acid and terpenes.

12 Claims, 2 Drawing Sheets

(51) Int. Cl.

| | |
|---|---|
| *A23L 2/06* | (2006.01) |
| *A23L 2/68* | (2006.01) |
| *A23L 2/70* | (2006.01) |
| *A23N 1/02* | (2006.01) |

(56) References Cited

U.S. PATENT DOCUMENTS

| | | | | |
|---|---|---|---|---|
| 2002/0051810 | A1* | 5/2002 | Suzuki | A61P 9/12 514/533 |
| 2005/0129827 | A1 | 6/2005 | Miljkovic et al. | |
| 2006/0210689 | A1 | 9/2006 | Velissariou et al. | |
| 2012/0040027 | A1 | 2/2012 | Milo et al. | |
| 2015/0093470 | A1 | 4/2015 | Hobson | |
| 2016/0015073 | A1 | 1/2016 | Belliveau et al. | |
| 2016/0021894 | A1 | 1/2016 | Belliveau et al. | |
| 2016/0165934 | A1 | 6/2016 | Hirschberg | |
| 2018/0289030 | A1 | 10/2018 | Muller | |

FOREIGN PATENT DOCUMENTS

| | | | |
|---|---|---|---|
| CN | 1059452 | | 3/1992 |
| CN | 109043085 | | 12/2018 |
| CN | 109315565 | A | 2/2019 |
| EP | 1782701 | A1 | 5/2007 |
| EP | 2241195 | A1 | 10/2010 |
| EP | 2285230 | A1 | 2/2011 |
| EP | 2543264 | A1 | 1/2013 |
| EP | 1863354 | B1 | 6/2013 |
| EP | 2598105 | A2 | 6/2013 |
| EP | 2282642 | B1 | 7/2013 |
| EP | 2512260 | B1 | 10/2013 |
| EP | 1615506 | B1 | 6/2014 |
| EP | 2897605 | A1 | 7/2015 |
| EP | 2967102 | A1 | 1/2016 |
| EP | 2967103 | A1 | 1/2016 |
| EP | 3344055 | A1 | 7/2018 |
| EP | 3417713 | A1 | 12/2018 |
| EP | 2759209 | B1 | 2/2019 |
| EP | 3358961 | B1 | 4/2020 |
| EP | 2897606 | B1 | 5/2020 |
| EP | 3687300 | A1 | 8/2020 |
| WO | 2004/098320 | A1 | 11/2004 |
| WO | 2009/132887 | A1 | 11/2009 |
| WO | 2012/013763 | A2 | 2/2012 |
| WO | 2014/044591 | A1 | 3/2014 |
| WO | 2014/085879 | A1 | 6/2014 |
| WO | 2014/144972 | A1 | 9/2014 |
| WO | 2014/158271 | A1 | 10/2014 |
| WO | 2015/078594 | | 6/2015 |
| WO | 2017/040810 | A1 | 3/2017 |
| WO | 2017/131222 | A1 | 8/2017 |
| WO | 2018/234528 | | 12/2018 |
| WO | 2019/063465 | A1 | 4/2019 |
| WO | 2020/193752 | A1 | 10/2020 |
| ZA | 200608698 | B | 7/2008 |

OTHER PUBLICATIONS

International Search Report and Written Opinion for PCT/US2020/051504 (Jan. 4, 2021).

Moon et al., "Role of Roasting Conditions in the Level of Chlorogenic Acid Content in Coffee Beans: Correlation with Coffee Acidity", Journal of Agricultural and Food Chemistry, 2009, 57: 5365-5369.

Farah et al., "Effect of Roasting on the Formation of Chlorogenic Acid Lactones in Coffee", Journal of Agricultural and Food Chemistry, 2005, 53: 1505-1513.

Clifford et al., "Hierarchial Scheme for LC-MS(n) Identification of Chlorogenic Acids", Journal of Agricultural and Food Chemistry, 2003, 51: 2900-2911.

Jeon et al., "Determination of chlorogenic acids and caffeine in homemade brewed coffee prepared under various conditions", Journal of Chromatography B, 2017, 1064: 115-123.

Narita et al., "Degradation Kinetics of Chlorogenic Acid at Various pH Values and Effects of Ascorbic Acid and Epigallocatechin Gallate on Its Stability under Alkaline Conditions", 2013, 61: 966-972.

Trugo et al., "A Study of the Effect of Roasting on the Chlorogenic Acid Composition of Coffee Using HPLC", Food Chemistry, 1984, 15: 219-227.

Olthof et al., "Consumption of high doses of chlorogenic acid, present in coffee, or of black tea increases plasma total homocysteine concentrations in humans", American Journal of Clinical Nutrition, 2001, 73: 532-538.

Kajikawa et al., "Coffee with a high content of chlorogenic acids and low content of hydroxyhydroquinone improves postprandial endothelial dysfunction in patients with borderline and stage 1 hypertension", European Journal of Nutrition, 2019, 58: 989-996.

Sulistyaningtyas et al., "Effectiveness of tofu waste for decreasing chlorogenic acid of robusta coffee (coffee robusta Lindl.Ex De Will)", Materials Science and Engineering, 2018, 434.

Husniati et al., "Chlorogenic Acid Isolation from Coffee as Affected by the Homogeneity of Cherry Maturity", Pelita Perkebunan, 2019, 35(2): 119-124.

Shan et al., "Simultaneous determination of chlorogenic acids in green coffee bean extracts with effective response factors", International Journal of Food Properties, 2017, 20(9): 2028-2040.

Kouadio et al., "Effect of Robusta (*Coffea canephora* P.) coffee cherries quantity put out for sun drying on contamination by fungi and Ochratoxin A (OTA) under tropical humid zone (Côte d'Ivoire)", Food and Chemical Toxicology, 2012, 50: 1969-1979.

Bassoli et al., "Instant coffee extract with high chlorogenic acids content inhibits hepatic G-6-Pase in vitro, but does not reduce the glycaemia", Cell Biochemistry & Function, 2015, 33: 183-187.

Suárez-Quiroz et al., "Isolation of green coffee chlorogenic acids using activated carbon", Journal of Food Composition and Analysis, 2014, 33: 55-58.

Hečimović et al., "Comparative study of polyphenols and caffeine in different coffee varieties affected by the degree of roasting", Food Chemistry, 2011, 129: 991-1000.

Hwa et al., "Simulateous Determination for the Contents of Caffeine and Chlorogenic Acid in Coffee Beans", Korean Journal of Community Living Science, 2013, 24(1): 5-12.

Kraehenbuehl et al., "Selective enzymatic hydrolysis of chlorogenic acid lactones in a model system and in a coffee extract. Application to reduction of coffee bitterness", Food Chemistry, 2017, 218: 9-14.

Cropley et al., "Does coffee enriched with chlorogenic acids improve mood and cognition after acute administration in healthy elderly? A pilot study", Psychopharmacology, 2012, 219: 737-749.

Heeger et al., "Bioactives of coffee cherry pulp and its utilisation for production of Cascara beverage", Food Chemistry, 2017, 221: 969-975.

Kim et al., "Caffeinated coffee, decaffeinated coffee, and the phenolic phytochemical chlorogenic acid up-regulate NQO1 expression and prevent H2O2-induced apoptosis in primary cortical neurons", Neurochemistry International, 2012, 60: 466-474.

Jaiswal et al., "Does roasted coffee contain chlorogenic acid lactones or/and cinnamoylshikimate esters?", Food Research International, 2014, 61: 214-227.

Takahama et al., "Formation of the Thiocyanate Conjugate of Chlorogenic Acid in Coffee under Acidic Conditions in the Presence of Thiocyanate and Nitrite: Possible Occurrence in the Stomach", Journal of Agricultural and Food Chemistry, 2007, 55: 4169-4176.

Bertrand et al., "Comparison of the Effectiveness of Fatty Acids, Chlorogenic Acids, and Elements for the Chemometric Discrimination of Coffee (*Coffea arabica* L.) Varieties and Growing Origins", Journal of Agricultural and Food Chemistry, 2008, 56: 2273-2280.

Matei et al, "Investigating the Chemical Changes of Chlorogenic Acids during Coffee Brewing: Conjugate Addition of Water to the Olefinic Moiety of Chlorogenic Acids and Their Quinides", Journal of Agricultural and Food Chemistry, 2012, 60: 12105-12115.

Jaiswal et al, "Understanding the fate of chlorogenic acids in coffee roasting using mass spectrometry based targeted and non-targeted analytical strategies", Food Function, 2012, 3: 976.

(56) References Cited

OTHER PUBLICATIONS

European Extended Search Report in Application 20866749.3, mailed Sep. 28, 2023, 23 pages.
Robert's Coffee: "News Jahwa-Cahwa", Internet citation, Mar. 5, 2005, retrieved from the Internet on Jul. 24, 2006: http://web.archive.org/web/2005020630724/www.robertscoffee.com/englanti/sibut/index_eng.htm, 1 page.
PCT International Preliminary Report on Patentability in Application PCT/US2020/051504, mailed Mar. 31, 2022, 9 pages.
Ortiz, Americo et al., "Volatile Composition of Coffee Berries at Different Stages of Ripeness and Their Possible Attraction to the Coffee Berry Borer Hypothenemus hampei (Coleoptera: Curculionidae)", J. Agric. Food Chem., 2004, 52, 5914-5918.
Mondello, Luigi et al., "Reliable characterization of coffee bean aroma profiles by automated headspace solid phase microextraction-gas chromatography-mass spectrometry with the support of a dual-filter mass spectra library", J. Sep. Sci, 2005, 28, pp. 1101-1109.
Korean Decision of Rejection in Application 10-2022-7012099, mailed Feb. 24, 2026, with English translation, 11 pages.

* cited by examiner

200

WHOLE PRESSED COFFEE BERRY JUICE

This application is a National Stage Application of PCT International Patent Application No. PCT/US2020/051504, filed Sep. 18, 2020, which claims the benefit of priority U.S. Provisional Application No. 62/902,053, filed Sep. 18, 2019, which applications are incorporated herein by reference. To the extent appropriate, a claim of priority is made to each of the above disclosed applications.

BACKGROUND

Coffee Cherries, commonly called Coffee Berries, are small rounded fruits about the size of grapes that grow in clusters along the branches of the coffee plant. They mature from green to a deep red or sometimes yellowish-red color. The skin of the fruit is smooth, taut and shiny with a bitter flavor, while the flesh is very sweet, tender and juicy, with blended notes of watermelon, hibiscus, berries, raspberries and cranberries. At the center of the fruit are two blue-green seeds, which are the fresh form of coffee beans.

Coffee Berries belong to the Rubiaceae family and are in the genus, *Coffea*. There are many different species of the Coffee Berry plant, but two of the main ones commercially cultivated today are *Coffea arabica*, known simply as arabica coffee, and *Coffea canephora*, known as robusta coffee. There are over 100 varieties of arabica coffee, which accounts for the majority of the world's coffee production today. Robusta coffee has higher caffeine content and more bitterness, and is primarily used in blends or instant coffees.

Coffee Berries are universally used for their seeds, which are roasted and processed to produce coffee. The flesh of Coffee Berries can be juiced and combined with other fruit juices or water, and can even be made into a drink powder. Roasted seeds can also be ground and used to flavor ice cream, baked goods, and chocolates, and the leaves of the Coffee Berry plant can be dried and steeped to make a slightly caffeinated tea. While the pulp and skin of Coffee Berries is discarded during the coffee production process, it is often repurposed as fertilizer and livestock feed. As Coffee Berries have been more widely recognized as a super-fruit, they are now more commonly found as an ingredient in nutritional supplements, beauty products, essential oils, and other stimulating beverages aside from coffee. Coffee Berries are highly perishable and should be used within a few days of harvesting. However, there is no known product, in particular no consumer juice product, that uses all of the various aforementioned portions of the coffee berry to create a final juice product. Non-limiting examples of final products include beverages such as juice, juice drinks, tea, hydration beverages, sparkling beverages and smoothies.

U.S. Pat. No. 6,572,915 describes a method of enriching fruit products and coffee with beneficial agents present in processing waste products such as fruit skins, kernels and coffee cherries. The waste products are dried and extracted with an appropriate organic solvent and/or water. The extract is dried and purified, if desired, and blended into the food product corresponding to the waste product, such as a fruit processing waste product extract could be combined with fruit juices, canned or frozen fruit, etc., and coffee cherry extract could be combined with ground or freeze-dried coffee. The '915 is directed to making an extract to increase antioxidants in a final end-product.

EP 1863354 teaches the use of a coffee berry such that a beverage formulation can be made having caffeine wherein the beverage contains caffeine levels in the range of about 0.07 to about 0.30 mg/ml, being optically clear, and having an added aroma; and wherein the beverage comprises an extract that is derived from at least one member of the group consisting of coffee cherry husks and coffee cherry pulp; wherein the extract is in the range of about 5 to about 30% based on standardized extract of the beverage; wherein at least a portion of the caffeine is derived from the extract; wherein the optically clear is measured by a haze value of at least below about 10; and wherein at least a portion of the added aroma is derived from aroma recovered from the extract. Yet, the caffeine levels shown in the EP '354 patent do not use the entire coffee berry, thus, do not provide an end product with caffeine levels sufficiently high to provide a beverage product with high levels of caffeine to provide a physiological effect.

WO 2004/98320 describes methods are provided for isolating a nutrient from coffee cherries or for producing a food product that comprises a coffee cherry or portion thereof (FIG. 3). It is particularly preferred that coffee cherries will have an extremely low concentration of mycotoxins, including various aflatoxins, fumonisins, ochratoxins, and/or vomitoxin (DON, deoxynivalenol). However, the WO '320 application requires the use of a solvent to extract the desired components from the coffee cherries.

There is a need for a consumer product that is derived from a whole coffee berry, which include the naturally occurring components, such as caffeine, chlorogenic acid (CGA) and terpenes.

SUMMARY

The present disclosure is directed to juices, juice products, and methods of producing a juice or a juice product. Especially preferred juices are derived from whole coffee berries. Especially preferred juice products comprise a juice derived from whole coffee berry. Especially preferred methods include whole coffee berries with increased concentrations of caffeine, CGA, and terpenes.

In one aspect of the inventive subject matter, a method of manufacture of a juice product has a step in which a coffee berry is included into the juice product, and it is preferred that the primary ingredient is a coffee berry. Coffee berries may be washed, and it is generally preferred that the coffee berry is contacted with a solution to reduce browning. It is still further particularly preferred that the juice product is a beverage, and it is contemplated that suitable beverages include a juice, and/or a carbonated beverage.

In another aspect of the inventive subject matter, a method of providing a nutrient-rich form of coffee berry juice from a coffee plant will include one step in which a coffee berry is provided and comminuted. In another step, the coffee berry is formed using the whole coffee berry. This process, unlike extracts, provide a process where the chemical profile of the coffee berry juice is not enhanced for any single particular nutrient fraction, but rather includes a chemical profile that aligns with the chemical profile of the entire coffee berry.

In yet another aspect of the inventive subject matter, a food product comprises a coffee berry juice or a juice product derived from coffee berries according to the present disclosure. The food product may consist essentially of a coffee berry juice or a juice product derived from coffee berries. The food product may alternatively comprise a coffee berry juice or a juice product derived from coffee berries and additional components or ingredients from other sources. The food product may be a solid food, a semi-solid food, a flowable food, a frozen food, a drink, or a beverage.

DETAILED DESCRIPTION

Figure 1:
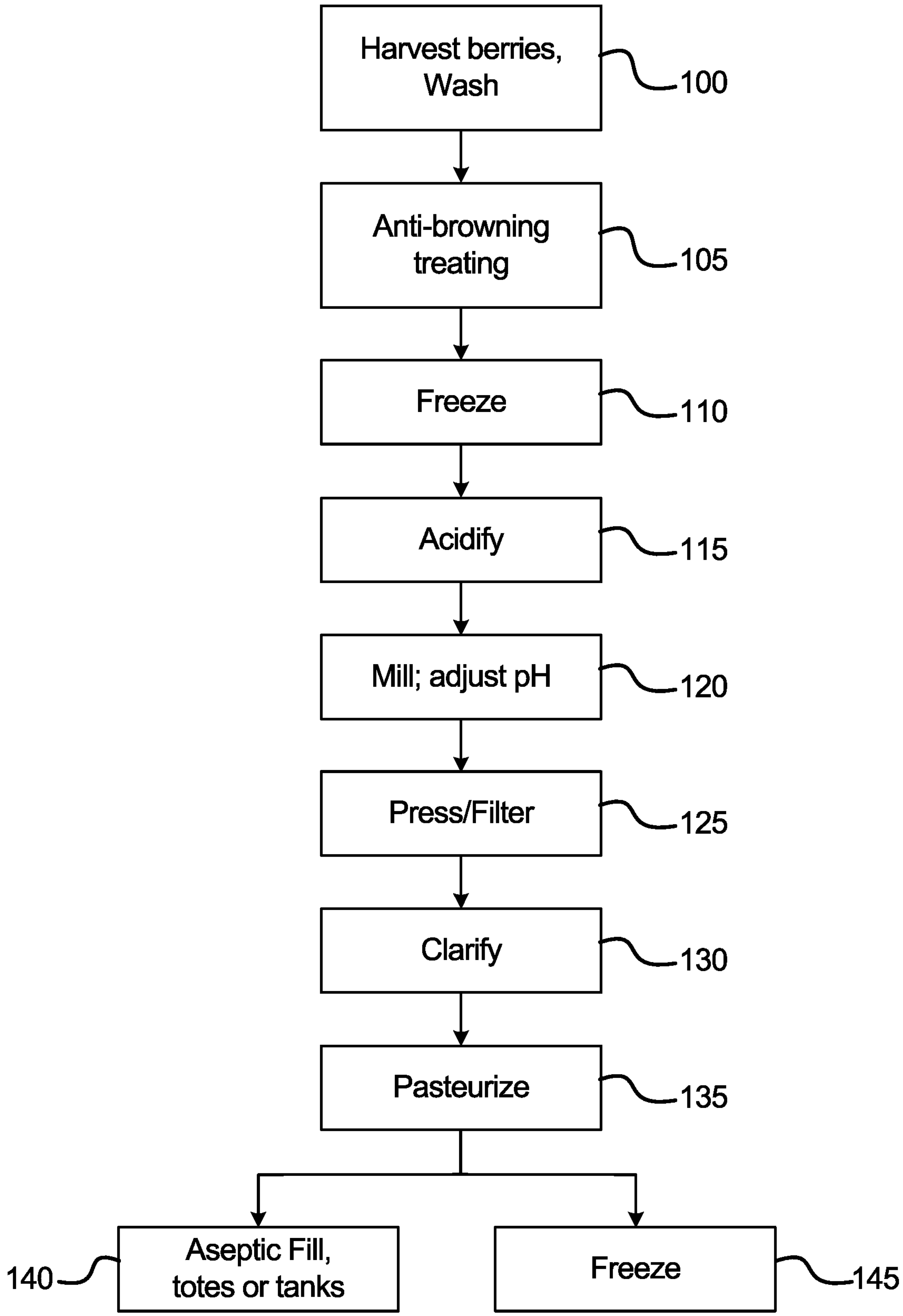
FIG. 1 is a flow chart of one example coffee berry juice manufacturing process.

The inventors have discovered that coffee berry juice produced from whole coffee berries can produce a distinct taste and chemical profile when compared to coffee and coffee berry extract products.

Definitions

The term "juice product" as used herein refers to a beverage product made from juices or combinations of juices with water or other components for human and/or animal nutritional, health-maintenance, health-improvement, and/or recreational purpose. Particularly preferred juice products include those consumed by human. "Juice" means a liquid that is found in nature in plant materials, or a diluted form of such liquid. A juice as used herein is not produced by solubilizing a plant material. "Extract" is a material that is drawn out or forcibly removed from a plant material, including through heat, chemical or high pressure means. While an extract may be in a liquid, it is not naturally found in liquid form in a plant but instead is a combination of chemical components that are not naturally found in the liquid of a plant.

As also used herein, the term "coffee berry" refers to the fruit of the coffee tree (*Coffea* species) in which exocarp and outer mesocarp (i.e., the pulp) surround the inner mesocarp (i.e. the mucilage) and endocarp (i.e., the hull), which in turn surround the seeds (i.e., the beans). Thus, the term coffee berry specifically refers to a whole coffee berry, which may or may not include the stem of the berry.

The term "ripe coffee berry" refers to a coffee berry that has reached the ripe stage, which is detectable by being substantially red in color. This is opposed to a sub-ripe coffee berry that is green in color. Viewed from another perspective, ripe coffee berries generally have a complete or almost complete (at least 95% of the berry) red color (or in some cases yellow color). Thus, a sub-ripe coffee berry will typically exhibit at least some green color (at least 5%, more typically at least 10%).

As also used herein, the term "nutrient" refers to a compound or mixture of compounds that is/are ingested and provides an alimentary benefit to the person ingesting the compound or mixture of compounds. Thus, the term nutrient as used herein specifically includes a compound or mixture of compounds that provide energy via metabolism of the compound or mixture of compounds (e.g., polysaccharides), interacts with the nervous system and/or immune system to modulate, and preferably stimulate, the nervous system and/or immune system (e.g., caffeine), or provides a protective function (e.g., polyphenols as antioxidant).

The term "polyphenol" as used herein refers to a diverse group of compounds produced by a plant, wherein the compounds include a phenol ring to which at least one OH group, and more typically at least two OH groups are covalently attached. For example, representative polyphenols include ellagic acid, tannic acid, vanillin, caffeic acid, CGA, ferulic acid, catechins (e.g., epicatechin gallate, epigallocatechin), flavonols (e.g., anthocyanidins, quercetin, kaempferol), and various other flavonoids, and their glycosides and depsides. Furthermore, contemplated polyphenols may also be in oligomeric or polymeric form (e.g., oligomeric proanthocyanidins or condensed tannins).

The term "about" is used in conjunction with numeric values to include normal variations in measurements as expected by persons skilled in the art, and is understood to have the same meaning as "approximately" and to cover a typical margin of error, such as ±10% of the stated value. The term "about" also encompasses amounts that differ due to different equilibrium conditions for a composition resulting from a particular initial composition. Whether or not modified by the term "about," the claims include equivalents to the quantities.

Coffee Berry Juice and Juice Product

Coffee berry juices derived from whole coffee berries and juice products comprising coffee berry juices will be described herein. As a note, the coffee berry juice may be a finished, semi-finished, or intermediate juice product. Alternatively, the coffee berry juice may be a final, drinkable, and ready-to-consume juice product. A juice product may consist essentially of the present coffee berry juice. Alternatively, the juice product may comprise the present coffee berry juice and additional components that are different from and/or not originally from the present coffee berry juice.

In some embodiments, a juice product includes a coffee berry juice, derived from a whole coffee berry. In certain embodiments, the coffee berry is selected from the group comprising of *Coffea arabica* or derivative thereof, *Coffea canephora* or derivative thereof and combination thereof. In embodiments where *Coffea canephora* is used, the coffee berry is selected from the group including but not limited to Crassifolia, gossweileri, hiernii, hinaultii, kouilouensis, laurentii, maclaudii, muniensis, nganda, oligoneura, opaca, robusta, sankuruensis, sankuruensis, stuhlmannii, trillesii, ugandae, welwitschii, wildemanii and combinations thereof. Furthermore, where the juice product include coffee berries from the *Coffea Arabica* species, the coffee berry is selected from the varietals that include, but are not limited to acaqua, amarelle, Anacafe 14, angustifolia, Batian, Bourbon Mayaguez 139, Bourbon Mayaguez 71, bourbon, brevistipulata, bullata, Casiopea, Catimor 129, catimor, Catisic, Catuai, catuey, caturra, Centroamericano, columnaris, Costa Rica 95, Cuscatleco, erecta, Evaluna, Fronton, Geisha (Panama), H3, Harrar Rwanda, IAPAR 59, Ihcafe 90, Jackson 2/1257, Java, K7, KP423, lempira, Limani, lobata, longistipulata, Maragogipe, Marsellesa, Mibiriza, Milenio, Mokka, monosperma, Mundo Maya, Mundo Novo, murta Lalière pendula, Nayarita, Nemaya, Nyasaland, Obata Rojo, Oro Azteca, Pacamara, Pacas, Pache, Parainema, polysperma, Pop3303/21, pubescens, purpurascens, RAB C15, rotundifolia, Ruiru 11, SL14, SL28, SL34, Starmaya, straminea, sundana, T5175, T5296, T8667, Tekisic, tupey, typica, variegate, Venecia, Villa Sarchi and combinations thereof. It should be appreciated that a skilled artisan could blend the various varieties and families of coffee berry to obtain various taste profiles. Using a single coffee berry variety or combination of coffee berry varieties would result in various chemical profiles, depending on the desired end coffee juice product.

In other related embodiments, the present juice product may optionally include a citrus fruit juice and/or an organic acid, added during production of the coffee berry juice. Where the citrus fruit juice and/or organic acid comprises a pH modifier selected from the group comprising of orange juice, lemon juice, lime juice, clementine juice, citron juice, tangerine juice, malic acid, citric acid and combinations thereof. In embodiments that include, or exclude, a tropical fruit juice, described below, the juice product may also include a citrus fruit juice and/or organic acid.

In embodiments that include, or exclude, a citrus fruit or organic acid, the juice product may also include a tropical fruit juice. In these example embodiments, the tropical fruit juice comprises an enzymatic oxidation modifier selected from the group comprising of acerola juice, acerola puree, ascorbic acid, citric acid, acetic acid and combinations thereof. In embodiments where acerola is utilized, the acerola may include, but are not limited to, varieties, such as B-17, Dwarf, Florida Sweet, Manoa Sweet, Beaumont, Haley, Hawaiian Queen, Maunawili, Red Jumbo, Rehnborg, Tropical Ruby and combinations thereof.

In some of the above example embodiments, the juice product will have a caffeine content of at least about 100 mg/L, or about 200 mg/L, or about 300 mg/L, or about 400 mg/L, or about 500 mg/L. In related embodiments, the chemical profile of the juice product will include a caffeine content from about 500 mg/L to about 7,000 mg/L, or from about 750 mg/L to about 6,000 mg/L, or from about 1,000 mg/L to about 5,000 mg/L, or from about 1,200 mg/L to about 4,000 mg/L, or from about 1,400 mg/L to about 3,000 mg/L, or from about 1,600 mg/L to about 2,600 mg/L. In some embodiments, the caffeine content of the juice product is from about 100 mg/L to about 2,600 mg/L, from about 300 mg/L to about 2,600 mg/L, from about 500 mg/L to about 2,600 mg/L, from about 700 mg/L to about 2,600 mg/L, from about 900 mg/L to about 2,600 mg/L, from about 1,100 mg/L to about 2,600 mg/L, from about 1,300 mg/L to about 2,600 mg/L, from about 1,500 mg/L to about 2,500 mg/L. In some embodiments, the caffeine content of the juice product is from about 4,500 mg/L to about 7,000 mg/L, from about 5,000 mg/L to about 7,000 mg/L, from about 5,500 mg/L to about 7,000 mg/L, from about 6,000 mg/L to about 7,000 mg/L, from about 6,500 mg/L to about 7,000 mg/L.

In other related embodiments, the juice product includes juices that are not from concentrate. In these example embodiments, the juice product comprises a chlorogenic acid (CGA) content of about 100 mg/L to about 24,000 mg/L, or 350 mg/L to about 24,000 mg/L, or about 300 mg/L to about 20,000 mg/L, or about 500 mg/L to about 15,000 mg/L, or from about 1,000 mg/L to about 10,000 mg/L, or from about 2,000 mg/L to about 8,000 mg/L, or from about 3,000 mg/L to about 6,000 mg/L, or from about 4,000 mg/L to about 5,000 mg/L. In some embodiments, the juice product comprises a chlorogenic acid (CGA) content of about 10,000 mg/L to about 30,000 mg/L, or about 12,000 mg/L to about 28,000 mg/L, or about 14,000 mg/L to about 26,000 mg/L, or about 16,000 mg/L to about 24,000 mg/L, or about 18,000 mg/L to about 22,000 mg/L. In other related embodiments, the juice product will include a CGA content of 550 mg/L to 24,000 mg/L, or 350 mg/L to 12,000 mg/L. In other related embodiments, the juice product will include a caffeine content of about 160 mg/L to about 5,500 mg/L, or from about 500 mg/L to about 5,000 mg/L, or from about 750 mg/L to about 4,000 mg/L, or from about 1,000 mg/L to about 3,000 mg/L, or from about 1,500 mg/L to about 3,000 mg/L, or from about 2,000 mg/L to about 3,000 mg/L. In other related embodiments, the juice product will include a caffeine content of 250 mg/L to 5,500 mg/L or 160 mg/L to 3,500 mg/L. In similar embodiments, the CGA content is calculated based on 5-O-caffeoylquinic acid (5-CQA) levels. In these particular embodiments, the juice product comprises a 5-CQA content of 350 mg/L to 24,000 mg/L. In other related embodiments, the juice product will include a 5-CQA content of 550 mg/L to 24,000 mg/L or 350 mg/L to 12,000 mg/L. In other preferred embodiments, the CGA content in the juice product is 80-90% 5-CQA of the total CGA content.

In these related embodiments that include juice not from concentrate, the juice product may have a final formulation that includes coffee berry juice from about 30 to about 100% of the final juice product. In other related embodiments, the juice product will include citrus fruit juice and/or organic acid between 0% to 50% of the coffee berry juice component. In other related embodiments, the juice product will include tropical fruit juice between 0% to 70% of the coffee berry juice component. In other related embodiments, the juice product will include tropical fruit juice between 2% and 15% of the juice product.

In some related embodiments, the not-from-concentrate juice product has a Brix value of about 3° to about 25°, or about 4° to about 20°, or about 5° to about 18°, about 6° to about 16°, about 7° to about 14°, or about 8° to about 12°, or about 9° to about 12°, or about 10° to about 12°, or about 9° to about 10°. In certain embodiments, the Brix value of the juice product is no more than about 12° sugar equivalent, no more than about 11° sugar equivalent, no more than about 10° sugar equivalent, or no more than about 9° sugar equivalent, or no more than about 8° sugar equivalent, or no more than about 7° sugar equivalent, or no more than about 6° sugar equivalent, or no more than about 5° sugar equivalents.

In other related embodiments, the juice product will include whole coffee berries pre-treated with 0.5% and 2% tropical fruit juice prior to forming the coffee berry juice. In these embodiments, the juice product may include such additional juice components.

In some embodiments, the juice product includes juices that are from concentrate. The from concentrate juice product may be made by a process involving removing water from the not-from-concentrate juice product, thereby arriving at a higher concentration in a range from about 1.5× to about 6× compared to the not-from-concentrate juice product. In related embodiments, the from concentrate coffee berry juice will include a CGA content of about 800 mg/L to about 96,000 mg/L, about 2,000 mg/L to about 90,000 mg/L, about 5,000 mg/L to about 80,000 mg/L, about 7,000 mg/L to about 70,000 mg/L, about 9,000 mg/L to about 65,000 mg/L, about 12,000 mg/L to about 60,000 mg/L, about 15,000 mg/L to about 50,000 mg/L, about 17,000 mg/L to about 40,000 mg/L, about 20,000 mg/L to about 30,000 mg/L. In other related embodiments, the juice product will include a CGA content of about 1,200 mg/L to about 192,000 mg/L, about 2,000 mg/L to about 180,000 mg/L, about 4,000 mg/L to about 160,000 mg/L, about 6,000 mg/L to about 160,000 mg/L, about 8,000 mg/L to about 120,000 mg/L, about 10,000 mg/L to about 100,000 mg/L, about 20,000 mg/L to about 90,000 mg/L, about 30,000 mg/L to about 80,000 mg/L, about 40,000 mg/L to about 60,000 mg/L. In similar embodiments, the CGA content is calculated based on 5-O-caffeoylquinic acid (5-CQA) levels. In these particular embodiments, the juice product comprises a 5-CQA content of 800 mg/L to 96,000 mg/L. In other related embodiments, the juice product will include a 5-CQA content of 1,200 mg/L to 192,000 mg/L. In other embodiments, the CGA content in the coffee berry juice is 80-90% 5-CQA of the total CGA content.

In other related embodiments of the from concentrate juice product derived from coffee berries, the from concentrate juice product will include a caffeine content of 350 mg/L to 28,000 mg/L. In other related embodiments, the juice product will include a caffeine content of 625 mg/L to 44,000 mg/L. In embodiments, the caffeine content is least about 350 mg/L, at least about 1,000 mg/L, at least about 2,000 mg/L, at least about 3,000 mg/L, at least about 4,000 mg/L, at least about 5,000 mg/L. In related embodiments, the chemical profile of the juice product will include a caffeine content from about 350 mg/L to about 28,000 mg/L, or from about 1,000 mg/L to about 25,000 mg/L, or from about 2,000 mg/L to about 20,000 mg/L, or from about 3,000 mg/L to about 15,000 mg/L, or from about 4,000 mg/L to about 12,000 mg/L, or from about 5,000 mg/L to about 10,000 mg/L, or from about 7,000 mg/L to about 10,000 mg/L, or from about 8,000 mg/L to about 10,000 mg/L. In some embodiments, the caffeine content of the juice product is from about 620 mg/L to about 44,000 mg/L, from about 2,000 mg/L to about 44,000 mg/L, from about 5,000 mg/L to about 44,000 mg/L, from about 10,000 mg/L to about 44,000 mg/L, from about 15,000 mg/L to about 44,000 mg/L, from about 19,000 mg/L to about 44,000 mg/L.

In some related embodiments, the from-concentrate juice product has a Brix value of about 20° to about 65°, or about 25° to about 60°, or about 30° to about 55°, about 35° to about 55°, about 40° to about 50°, In certain embodiments, the Brix value of the juice product is no more than about 65° sugar equivalent, or no more than about 60° sugar equivalent, or no more than about 55° sugar equivalent, or no more than about 50° sugar equivalent, or no more than about 45° sugar equivalent, or no more than about 40° sugar equivalents.

In these related embodiments that include juice from concentrate, the juice product has a final formulation that includes coffee berry juice from about 1 to about 100% of the juice product. In other related embodiments, the juice product will include a citrus fruit juice and/or an organic acid between 0% to 50% of the juice product. In related embodiments, the citrus fruit juice is between 0% and 2% of the juice product. In other related embodiments, the juice product will include tropical fruit juice between 0% to 70% of the juice product. In other related embodiments, the juice product will include tropical fruit juice between 2% and 15% of the juice product. In other related embodiments, the juice product will include whole coffee berries pre-treated with 0.5% and 2% tropical fruit juice prior to forming the coffee berry juice.

Production of Coffee Berry Juice and Juice Product

Harvest/Drying

In one exemplary aspect of the inventive subject matter, whole undamaged sub-ripe (e.g., semi ripe or almost ripe) coffee berries are harvested. It is generally contemplated that the sub-ripe coffee berries may be derived from various sources, and the particular use of the sub-ripe coffee berries will at least, in part, determine the particular source(s). However, in some preferred embodiments, it is preferred that the sub-ripe coffee berries are derived from a single coffee species, such as *Coffea arabica*, which is cultivated under similar growth conditions (e.g., shade-grown). Furthermore, it should be appreciated that depending on the particular product or use for the coffee berry, the degree of ripeness may vary considerably. In still further contemplated aspects, unripe coffee berries, or any reasonable mixtures of varying ripeness degrees may be used. Furthermore, ripe coffee berries may also be used. While not limiting to the inventive subject matter, it is generally preferred that the coffee berries are washed with water or other aqueous solution to remove soil particles and other debris before drying.

Referring now to FIG. 1 where a process flow for preparing coffee berry juice is shown. In one example embodiment, a coffee berry is harvested (100). It should be appreciated that the level of ripeness results in a change in moisture level of the coffee berry. For instance, when a coffee berry is substantially red, this will result in a coffee berry moisture content that is significantly higher than a less ripe (green) coffee berry. Once harvested the coffee berry is then washed to remove any external dirt or debris from the coffee berry.

Coffee berries of the species *Coffea arabica, Coffea canephora* or combination thereof are within the scope of the present disclosure. In some example embodiments, where coffee berries from the *Coffea canephora* species are used varietals such as Crassifolia, gossweileri, hiernii, hinaultii, kouilouensis, laurentii, maclaudii, muniensis, nganda, oligoneura, opaca, robusta, sankuruensis, sankuruensis, stuhlmannii, trillesii, ugandae, welwitschii, wildemanii and combinations thereof are within the scope of the present disclosure. Where the *Coffea arabica* coffee berries are desired, theses berries may come from the varieties that include, but are not limited to acaqua, amarelle, Anacafe 14, angustifolia, Batian, Bourbon Mayaguez 139, Bourbon Mayaguez 71, bourbon, brevistipulata, bullata, Casiopea, Catimor 129, catimor, Catisic, Catuai, catuey, caturra, Centroamericano, columnaris, Costa Rica 95, Cuscatleco, erecta, Evaluna, Fronton, Geisha (Panama), H3, Harrar Rwanda, IAPAR 59, Ihcafe 90, Jackson 2/1257, Java, K7, KP423, lempira, Limani, lobata, longistipulata, Maragogipe, Marsellesa, Mibiriza, Milenio, Mokka, monosperma, Mundo Maya, Mundo Novo, murta Lalière pendula, Nayarita, Nemaya, Nyasaland, Obata Rojo, Oro Azteca, Pacamara, Pacas, Pache, Parainema, polysperma, Pop3303/21, pubescens, purpurascens, RAB C15, rotundifolia, Ruiru 11, SL14, SL28, SL34, Starmaya, straminea, sundana, T5175, T5296, T8667, Tekisic, tupey, typica, variegate, Venecia, Villa Sarchi and combinations thereof.

Once the coffee berry is washed, the berry is processed to prevent or reduce browning of the coffee berry (105). In example embodiments, the coffee berries are pre-treated using a tropical fruit juice that comprises an enzymatic oxidation modifier. The enzymatic oxidation modifier includes, but is not limited to acerola juice, acerola puree, ascorbic acid, citric acid, acetic acid and combinations thereof. While the use of tropical fruit and or acids may be used to prevent browning of the coffee berry, other methods, such as blanching may also be used.

In embodiments were the tropical fruit juice or acid is utilized, these enzymatic oxidation modifiers are present in the juice product at a concentration of about 0.5 wt. % to about 5 wt. %; alternatively of about 0.5 wt. % to about 2 wt. %; or alternatively, of about 0.5 wt. % to about 1 wt. % based on weight of the juice product.

Freeze

Upon treatment with an enzymatic oxidation modifier, the coffee berries may be optionally frozen (110). During the freezing process, cell lysis occurs. During freezing step (110) coffee berries may be subjected at least one, to multiple cycles of freezing. Since the cells swell as ice crystals form during the freezing process and contract during thawing, the cell walls will ultimately give in and break as the sample is subjected to the process. In some example embodiments, the freezing occurs at 0° F. (−18° C.). The freezing process may be used to improve juice yield.

Acidify

The coffee berries are then acidified (115) where this step can be performed before or after milling. Lemon juice to reduce pH to less than 4.6 for food safety (high acid food). In related examples the use of acerola, or other tropical fruit juice, can be utilized for oxidative stability throughout processing. Process occurring before or after milling include concentrations such as 7% Not from Concentrate (NFC) Lemon Juice and 13.5% NFC Acerola Juice or Puree. In other related embodiments, NFC lemon juice included working ranges from 0%-12% (wt/wt). In at least this example embodiment, the coffee berries are reduced to a pH≤4.1. It should be appreciated that the pH level depends on berry pH and fineness of berry milling (pH increases if beans are fine). In some example embodiments, the percentage of NFC lemon juice is about 7.00%. In other related embodiments, the NFC lemon juice is between 0%-50%. In related embodiments, the use of NFC Acerola juice is used in levels between 0%-70%. In preferred embodiments, the level of NFC Acerola juice is between 0%-13.5% (wt/wt). In more preferred embodiments, the NFC Acerola juice is about 13.50%.

Mill

The method of preparing a coffee juice product further includes the step of milling (120). In this process step, the coffee berries are milled to reduce particle size of berry skins, flesh & bean to improve juice yield and active component yields, such as polyphenols, caffeine, etc. In one example embodiment, the coffee berries were blended, or placed in a production scale mill in order to reduce the particles size. Once the coffee berry mixture is milled, the mixture may optionally include a pH adjustment to arrive at or about a pH of 4.1. While not wanting to be bound to any particular methodology, the use of NFC citrus juice or acid is preferred. In one example embodiment, the use of NFC lemon juice is used. Once milled, the coffee berry juice mixture may optionally be treated with enzymes. This enzymatic treatment is used to increase juice yield. Enzymes that can be utilized include, but are not limited to, pectinases and cellulases. In some example embodiments, the enzyme is added from about 0 to 250 ppm. In related embodiments, the yield will increase between about 0% to 8%.

Press-Filter

If the coffee berries undergo the milling step, the milled, or at least the anti-browning treated, coffee berry mixture is further pressed and filtered (125). Milled berry and juice mash is pressed to separate juice from solids. In a preferred embodiment, the filtered coffee berry juice has an average particle size of no greater than 5 micrometers.

Clarify the coffee berry juice may be subject to a clarifying step (130) where the coffee berry juice is processed to reduce solids (cloud) and reduce beany flavor imparted by suspended solids. In one example embodiment, the clarifying step includes a centrifugation step. One such example includes a continuous centrifugation from between 3000 rpm to 18,000 rpm. In other related embodiments, the coffee juice undergoes a filtration process, such as vacuum filter, microfiltration (0.2 to 5 micron) syringe filters and/or water filters. Clarifying step (130) provides approximately a 10% reduction in caffeine level, reduced cloudiness by visual comparison, reduced beany flavor by informal sensory assessment.

Pasteurize

Upon clarifying, the juice alone or a juice product can be pasteurized (135). In one example process, the juice is subjected to heat under time and temperature conditions to achieve commercial sterility based on targeted microorganism. In one example embodiment, coffee juice was batch pasteurize in bottle 75° C. for 10 min. In other related embodiments, coffee juice is heat pasteurized by direct steam injection at least 130° C. for 6 seconds. Once the coffee berry juice is pasteurized, the coffee berry juice may be frozen (145) for later use or placed in containers, totes or tanks for use.

Aseptic Fill

The coffee berry juice may be further placed into sanitized/sterile containers under aseptic conditions (140), either alone or in combination with other components including water, juices, additional ingredients from other sources.

Figure 2:
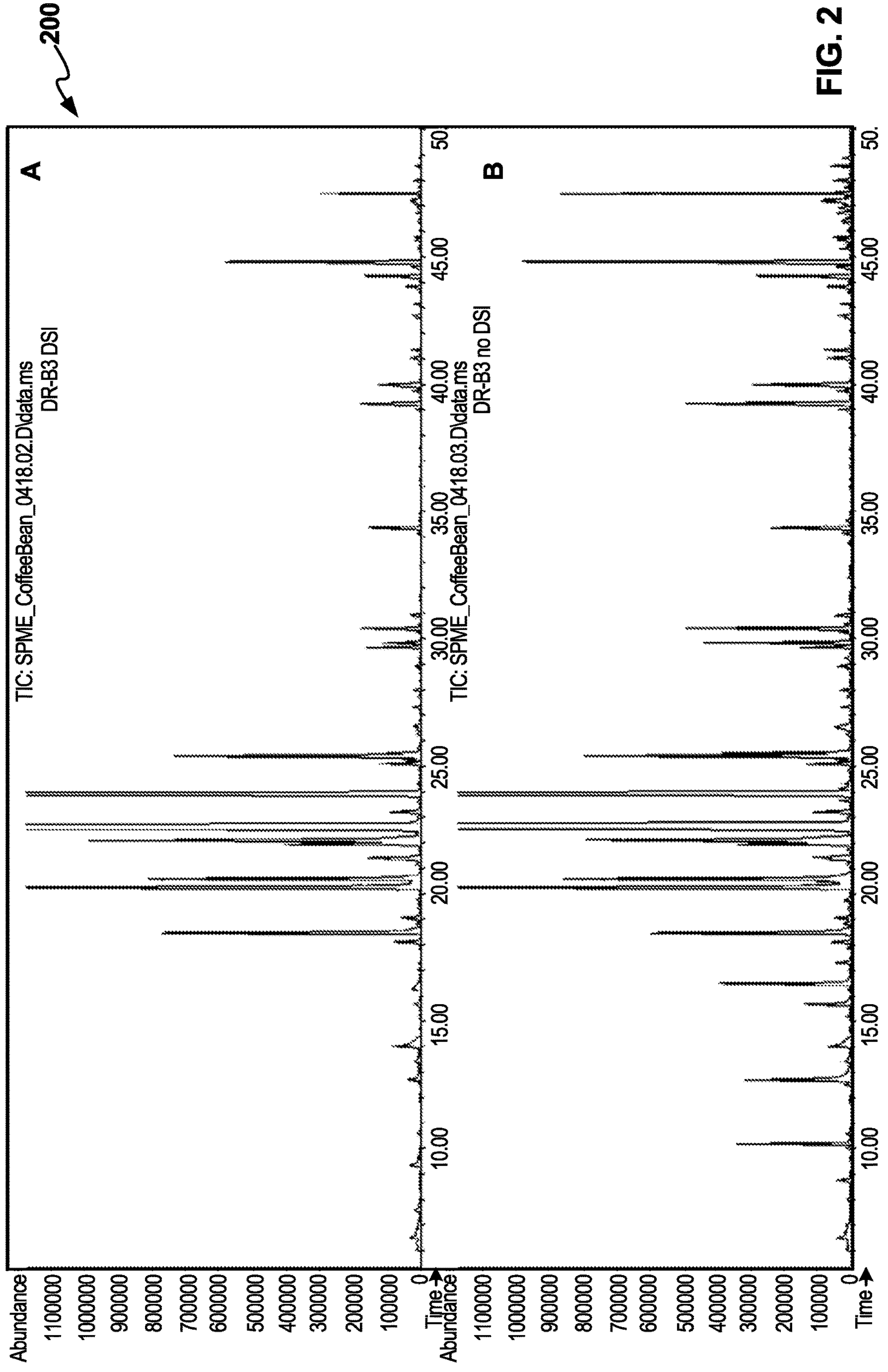
FIG. 2 is chromatograph showing volatiles in coffee berry juice with and without Direct Steam Injection (DSI) pasteurization treatment.

Referring now to FIG. 2 where two chromatographs are shown. All samples in FIG. 2 were analyzed by volatile profile screening method with SPME-GC/MS. The coffee berry juice samples were compared with and without direct steam injection (DSI) followed by vacuum cool prior to filling. Vacuum cooling flashes off beany notes. In one example, coffee juice was vacuum cooled to 9° C.

As shown in FIG. 2A, a sample treated with DSI when compared to a FIG. 2B which included no DSI vacuum cooling. The results indicate that the test sample under two different treatments maintains generally consistent among the volatile profiles, except the DSI treated sample (2A) appeared to have lost some of the high volatiles (i.e. alcohols and esters), such as Green Bean/Bell Pepper Aroma compounds. More specifically, 2-pentlyfuran, bean pyrazine (2-isopropyl-3-methoxy-pyrazine) and galbanum pyrazine (2-isobuty-3-methoxy-pyrazine).

Referring now to Table 2A and 2B, which includes Example 1-16 showing comparison of various methods of make coffee berry juice products. Each of the various methodologies are shown in Tables 2A and 2B. Results indicate effects of juice yield based in berry type, acid treatment, percentage of berries, heat treatment and enzymatic treatment relative to juice yield, caffeine concentration and browning.

Food and Beverage Containing Coffee Berry Juice

The coffee berry juice or the juice product derived from coffee berries according to the present disclosure can by itself serve as a final food product to consumers, or alternatively be used as a component or an ingredient and combined with other components or ingredients to make foodstuffs, beverages, or final food products.

In some aspects, the present disclosure provides a food product such as a foodstuff or a beverage, wherein the food product comprises a coffee berry juice or a juice product described herein. In some embodiments, a beverage comprises a coffee berry juice of the present disclosure, wherein the coffee berry is sourced from *Coffea arabica* or *Coffea canephora*, and wherein the coffee berry juice is a not-from-concentrate juice or a juice from concentrate. Preferably, the coffee berry juice is from about 0.1% to about 100%, or from about 0.1% to about 50%, or from about 0.1% to about 40%, or from about 0.1% to about 30%, or from about 0.1% to about 20%, or from about 0.5% to about 40%, or from about 1% to about 30%, or from about 5% to about 20%, or from about 10% to about 15%, based on the total weight of the beverage. The beverage includes but is not limited to fruit/vegetable juices, juice drinks, fruit/vegetable smoothies, ready-to-drink coffee beverages, ready to drink tea beverages, sparkling beverages, still beverages such as hydration or water, diary beverages, cultured beverages such as yogurt, ready to drink plant-based beverages, energy beverages or shots, syrup for food service beverages, or other liquid or flowable foods.

In some embodiments, a foodstuff comprises a coffee berry juice of the present disclosure, wherein the coffee berry is sourced from *Coffea arabica* or *Coffea canephora*, and wherein the coffee berry juice is a not-from-concentrate juice or a juice from concentrate. Preferably, the coffee berry juice is from about 0.1% to about 100%, or from about 1% to about 100%, or from about 5% to about 100%, or from about 10% to about 100%, or from about 20% to about 100%, or from about 0.1% to about 50%, or from about 0.1% to about 40%, or from about 0.1% to about 30%, or from about 0.1% to about 20%, based on the total weight of the foodstuff. The foodstuff includes but is not limited to solid food products, semi-solid food products, puddings, functional gels such as squeeze pouch, energy bars or a binder phase thereof, energy chews or gummies, energy drops, energy spray, frozen popsicle, cakes, breads, muffins, or baked products.

Table 1 further describes the use and application of the present coffee berry juice as a component for various foodstuff and beverage products.

TABLE 1

| Application | Ingredient Form of the Coffee Berry Juice or the Juice Product | Possible Usage Level |
|---|---|---|
| Fruit and Vegetable Juices, Juice Drinks | Juice Not-From-Concentrate or Juice Concentrate, sourced from Arabica or Robust berries | 0.1%-50% |
| Fruit/Vegetable Smoothies | Juice Not-From-Concentrate or Juice Concentrate, sourced from Arabica or Robust berries | 0.1%-50% |
| Ready-to-Drink Coffee Beverages | Juice Not-From-Concentrate or Juice Concentrate, sourced from Arabica or Robust berries | 0.1%-50% |
| Ready-to-Drink Tea Beverages | Juice Not-From-Concentrate or Juice Concentrate, sourced from Arabica or Robust berries | 0.1%-30% |
| Sparkling Beverages | Juice Not-From-Concentrate or Juice Concentrate, sourced from Arabica or Robust berries | 0.1%-50% |
| Still Beverages (hydration, water) | Juice Not-From-Concentrate or Juice Concentrate, sourced from Arabica or Robust berries | 0.1%-50% |
| Dairy Beverages, including cultured (yogurt) beverages | Juice Not-From-Concentrate or Juice Concentrate, sourced from Arabica or Robust berries | 0.1%-30% |
| Yogurt | Juice Not-From-Concentrate or Juice Concentrate, sourced from Arabica or Robust berries | 0.1%-30% |
| Ready-to-Drink Plant-Based Beverages | Juice Not-From-Concentrate or Juice Concentrate, sourced from Arabica or Robust berries | 0.1%-20% |
| Energy Beverages/ Shots | Juice Not-From-Concentrate or Juice Concentrate, sourced from Arabica or Robust berries | 1%-100% |
| Syrup for Food Service Beverages | Juice Concentrate, sourced from Arabica or Robust berries | 20%-100% |
| Functional Gel (e.g. squeeze pouch) | Juice Not-From-Concentrate or Juice Concentrate, sourced from Arabica or Robust berries | 1%-100% |
| Energy Bars, Binder phase | Juice Not-From-Concentrate or Juice Concentrate, sourced from Arabica or Robust berries | 0.1%-40% |
| Energy Chews or Gummies | Juice Not-From-Concentrate or Juice Concentrate, sourced from Arabica or Robust berries | 0.1%-50% |
| Energy Drops | Juice Concentrate, sourced from Arabica or Robust berries | 20%-100% |
| Energy Spray | Juice Not-From-Concentrate or Juice Concentrate, sourced from Arabica or Robust berries | 5%-100% |
| Frozen Popsicle Form | Juice Not-From-Concentrate or Juice Concentrate, sourced from Arabica or Robust berries | 0.1%-100% |

Examples

Certain embodiments of the present disclosure are further described with reference to the following examples. These examples are intended to be merely illustrative of the disclosure and are not intended to limit or restrict the scope of the present disclosure in any way and should not be construed as providing conditions, parameters, reagents, or starting materials that must be utilized exclusively in order to practice the art of the present disclosure.

Table 2A and 2B include Examples 1-16 of coffee berry juice or juice products treated under various conditions. Example 1 shows a control coffee berry juice without additional component or juice or acid added thereto and produced without heat/enzyme treatment. Examples 3-6 showed juice products of 75% coffee berries with 25% acerola juice as the additional component. Examples 2 and 7-10 include juice products made from 90% coffee berries with 10% lemon juice as the additional component. Examples 11-16 include juice products made from 78% coffee berries with 2.4% lemon juice and 15.6% acerola juice as the additional components. Optional treatments like enzyme treatment or heat treatment or both were used in the process of making the juice products. As shown in Examples 2, 5 and 11, it was surprisingly found that the yield of the juice product was significantly improved when additional juice was added to the coffee berries during production, compared to Example 1. It was also found the heat treatment can improve the caffeine content in the juice products.

Table 3A and 3B include Examples 17-29. Examples 17-29 show the process of recycled juice to alter juice yield (Example 17-18). Recycling coffee berry juice does not increase caffeine yield. Further, filtering improves clarity with ~9% reduction in caffeine yield. As shown in Example 19, the use of cellulase did not provide significant changes in caffeine yield. Furthermore, Examples 20-29 shown that the use of water in place of added juice (acerola/lemon) had same impact on caffeine level (not specific to acerola). Maduro berries without heat-steep step have lower caffeine than mixed berries. It was also found that Maduro berries have lower Brix than mixed varieties.

TABLE 2A

| Example | Berry Type | Acid Treatment | % Berries | Heat Treatment |
|---|---|---|---|---|
| Example 1 | DR Mixed | None | 100 | None |
| Example 2 | DR Mixed | 10% lemon | 90 | None |
| Example 3 | DR Mixed | 25% acerola | 75 | None |
| Example 4 | DR Mixed | 25% acerola | 75 | 180 °F, 30 min |
| Example 5 | DR Mixed | 25% acerola | 75 | None |
| Example 6 | DR Mixed | 25% acerola | 75 | 180 °F, 30 min |
| Example 7 | DR Mixed | 10% lemon | 90 | None |
| Example 8 | DR Mixed | 10% lemon | 90 | 180 °F, 30 min |
| Example 9 | DR Mixed | 10% lemon | 90 | None |
| Example 10 | DR Mixed | 10% lemon | 90 | 180 °F, 30 min |
| Example 11 | DR Mixed | 2.4% lemon juice, 15.6% acerola | 78 | None |
| Example 12 | DR Mixed | 2.4% lemon juice, 15.6% acerola | 78 | 180 °F, 30 min |
| Example 13 | DR Mixed | 2.4% lemon juice, 15.6% acerola | 78 | None |
| Example 14 | DR Mixed | 2.4% lemon juice, 15.6% acerola | 78 | 180 °F, 30 min |
| Example 15 | DR Mixed | 2.4% lemon juice, 15.6% acerola | 78 | None |
| Example 16 | DR Mixed | 2.4% lemon juice, 15.6% acerola | 78 | 180 °F, 30 min |

TABLE 2B

| Example | Other | Caffeine (mg/L) | CGA (mg/L) | CGA (mg/L) -dup | pH | Brix | Caffeine mg/g Coffee Berries | Juice Yield (%) |
|---|---|---|---|---|---|---|---|---|
| Example 1 | | 2074 | — | | 4.80 | 13.74 | 2.07 | 38 |
| Example 2 | | 1889 | — | | 4.20 | 13.02 | 2.10 | 43.8 |
| Example 3 | | 1825 | — | | 4.23 | 11.73 | 2.43 | 57.26 |
| Example 4 | | 2011 | — | | 4.28 | 11.90 | 2.68 | 54.8 |
| Example 5 | Enzyme Treatment, 250 ppm, 1 hr 50 C | 1847 | | | 4.15 | 12.04 | 2.46 | 59.34 |
| Example 6 | Enzyme Treatment, 250 ppm, 1 hr 50 C | 2003 | | | 4.19 | 12.10 | 2.67 | 56.62 |
| Example 7 | | 1923 | — | | 4.15 | 12.53 | 2.14 | 51.64 |
| Example 8 | | 2197 | 529 | 533 | 4.17 | 12.60 | 2.44 | 45.85 |
| Example 9 | Enzyme Treatment, 250 ppm, 1 hr 50 C | 1860 | | | 4.05 | 12.73 | 2.07 | 50.6 |
| Example 10 | Enzyme Treatment, 250 ppm, 1 hr 50 C | 2088 | | | 4.06 | 12.48 | 2.32 | 50.84 |
| Example 11 | | 1921 | — | | 4.24 | 12.32 | 2.46 | 49.78 |
| Example 12 | | 2140 | — | | 4.25 | 12.02 | 2.74 | 50.15 |
| Example 13 | Enzyme Treatment, 250 ppm, 1 hr 50 C | 1988 | | | 4.15 | 12.43 | 2.55 | 55.28 |
| Example 14 | Enzyme Treatment, 250 ppm, 1 hr 50 C | 2150 | | | 4.18 | 12.48 | 2.76 | 50.7 |
| Example 15 | Enzyme Treatment, 200 ppm, 1.5 hr 50 C | 2051 | | | 4.15 | 12.62 | 2.63 | 52.73 |
| Example 16 | Enzyme Treatment, 200 ppm, 1.5 hr 50 C | 2211 | | | 4.18 | 12.73 | 2.83 | 46.23 |

TABLE 3A

| Example | Berry Type | Pre-Treatment | Acid Treatment | % berries | Heat Treatment | Other |
|---|---|---|---|---|---|---|
| Example 17 | DR Mixed | None | 7.7% lemon, 13.3% acerola | 79 | 180° F., 30 min | |
| Example 18 | DR Mixed | None | 7.7% lemon, 13.3% acerola | 79 | 180° F., 30 min | filtered |
| Example 19 | DR Mixed | None | 7.5% lemon, 12.5% acerola | 80 | 180° F., 30 min | enzyme treatment |
| Example 20 | Maduro | 1% acerola | None, 20% water | 80 | None | |
| Example 21 | Maduro | 1% acerola | 7.5% lemon, 12.5% acerola | 80 | None | pre-pasteurized |
| Example 22 | Maduro | 1% acerola | 7.5% lemon, 12.5% acerola | 80 | None | filtered, pasteurized |
| Example 23 | Maduro | 1% acerola | 7.5% lemon, 12.5% acerola | 80 | 180° F., 30 min | |
| Example 24 | Maduro | 1% acerola | 7.5% lemon, 12.5% acerola | 80 | 180° F., 30 min | filtered |
| Example 25 | Maduro | 1% acerola | 7.5% lemon, 12.5% acerola | 80 | 180° F., 30 min | pre-pasteurized |
| Example 26 | Maduro | 1% acerola | 7.5% lemon, 12.5% acerola | 80 | 180° F., 30 min | pasteurized |
| Example 27 | Maduro | 1% acerola | 7.5% lemon, 12.5% acerola | 80 | 180° F., 30 min | pasteurized |

TABLE 3A-continued

| Example | Berry Type | Pre-Treatment | Acid Treatment | % berries | Heat Treatment | Other |
|---|---|---|---|---|---|---|
| Example 28 | Maduro | 1% acerola | 7.5% lemon, 12.5% acerola | 80 | 180° F., 30 min | pasteurized |
| Example 29 | Maduro | 1% acerola | 7.5% lemon, 12.5% acerola | 80 | 180° F., 30 min | pasteurized |

TABLE 3B

| Example | Caffeine (mg/L) | CGA (mg/L) | CGA (mg/L)-dup | Vit C | pH | Brix | Caffeine mg/g Coffee Berries | Juice Yield (%) |
|---|---|---|---|---|---|---|---|---|
| Example 17 | 2108 | — | | — | 4.14 | 12.27 | 2.67 | 50.6 |
| Example 18 | 1915 | — | | — | 4.14 | 12.27 | 2.42 | |
| Example 19 | 2094 | 717 | 718 | — | 4.16 | 12.89 | 2.62 | 48 |
| Example 20 | 1510 | 120 | | — | 4.93 | 8.23 | 1.89 | 43 |
| Example 21 | 1560 | 330 | | — | 4.1 | 10.65 | 1.95 | 45.4 |
| Example 22 | 1510 | 2140 | 1557 (2 wk) | none | 4.1 | 10.65 | 1.89 | |
| Example 23 | 2058 | — | | — | 4.11 | 10.61 | 2.57 | 52 |
| Example 24 | 2032 | 3471 | | — | 4.11 | 10.57 | 2.54 | 43.68 |
| Example 25 | 1919 | 1916 | | | | | 2.40 | 58.26 |
| Example 26 | 1919 | ~2900 | | none | | | 2.40 | |
| Example 27 | 1942 | 4167 | | | | | 2.43 | |
| Example 28 | | | | | | | 0.00 | |
| Example 29 | | | | | | | 0.00 | |

Table 4A provides various terpene amounts found in a sample of the coffee berry juice compared to a sample of brewed coffee from a comparative study. Another comparison between the coffee berry juice with a commercial coffee berry extract obtained from Van Drunen Farms was also conducted (data not shown). It was found that the present juice product from whole coffee berry compared to the bean, brewed coffee, or coffee berry extract provides significant increases in terpene levels. Table 4B provides various terpene amounts found in another sample of coffee berry juice compared to a sample of fresh orange juice. It was found that the present coffee berry juice has detectable amount of α-pinene, β-Pinene, Myrcene, Myrcene, Limonene, and γ-Terpinene. Surprisingly, the present coffee berry juice can have about 0.60 ppm of β-Pinene, which was not found in neither brewed coffee nor fresh orange juice.

TABLE 4A

| | Coffee Berry Juice | | Brewed Coffee | |
|---|---|---|---|---|
| | Average (ppm) | STD (%) | Average (ppm) | STD (%) |
| α-pinene | 0.28 | 9% | NO* | — |
| Sabinen | NQ* | — | NO* | — |
| β-Pinene | 0.60 | 10% | NO* | — |
| Myrcene | 0.24 | 9% | NO* | — |
| Limonene | 4.24 | 8% | NQ* | — |
| γ-Terpinene | 1.12 | 8% | NQ* | — |

*NQ: the amount is too low to quantify

TABLE 4B

| | Coffee Berry Juice | | Fresh Orange Juice | |
|---|---|---|---|---|
| | Average (ppm) | STD (%) | Average (ppm) | STD (%) |
| α-pinene | 0.16 | 9% | 1.00 | 1% |
| Sabinen | NQ* | — | 0.23 | 1% |
| β-Pinene | 0.60 | 10% | NQ* | |
| Myrcene | 0.14 | 9% | 4.03 | 1% |
| Limonene | 4.27 | 8% | 168.32 | 1% |
| γ-Terpinene | 1.03 | 8% | 0.11 | 1% |

*NQ: the amount is too low to quantify

The above specification, examples and data provide a complete description of the manufacture and use of the composition of the invention. Since many embodiments of the invention can be made without departing from the spirit and scope of the invention, the invention resides in the claims hereinafter appended.

The following numbered clauses define further example aspects and features of the present disclosure:

1. A juice product comprising:
   a coffee berry juice, derived from a whole coffee berry.
2. The juice product of clause 1, wherein the juice product further comprises a citrus fruit juice and/or an organic acid.
3. The juice product of any of clauses 1 to 2, wherein the juice product further comprises a tropical fruit juice.
4. The juice product of any of clauses 1 to 3, wherein the caffeine content in the final juice product is at least about 500 mg/L.
5. The juice product of any of clauses 1 to 3, wherein the caffeine content in the final juice product is from about 500 mg/L to 7,000 mg/L.
6. The juice product of any of clauses 1 to 5, wherein the coffee berry is selected from the group comprising of *Coffea Arabica* or derivative thereof, *Coffea canephora* or derivative thereof and combination thereof.

7. The juice product of clause 6, wherein the *Coffea canephora* coffee berry is selected from the group comprising crassifolia, gossweileri, hiernii, hinaultii, kouilouensis, laurentii, maclaudii, muniensis, nganda, oligoneura, opaca, robusta, sankuruensis, sankuruensis, stuhlmannii, trillesii, ugandae, welwitschi, wildemanii and combinations thereof.

8. The juice product of clause 6, wherein the *Coffea arabica* coffee berry is selected from the group comprising of acaqua, amarelle, Anacafe 14, angustifolia, Batian, Bourbon Mayaguez 139, Bourbon Mayaguez 71, bourbon, brevistipulata, bullata, Casiopea, Catimor 129, catimor, Catisic, Catuai, catuey, caturra, Centroamericano, columnaris, Costa Rica 95, Cuscatleco, erecta, Evaluna, Fronton, Geisha (Panama), H3, Harrar Rwanda, IAPAR 59, Ihcafe 90, Jackson 2/1257, Java, K7, KP423, lempira, Limani, lobata, longistipulata, Maragogipe, Marsellesa, Mibiriza, Milenio, Mokka, monosperma, Mundo Maya, Mundo Novo, murta Lalière pendula, Nayarita, Nemaya, Nyasaland, Obata Rojo, Oro Azteca, Pacamara, Pacas, Pache, Parainema, polysperma, Pop3303/21, pubescens, purpurascens, RAB C15, rotundifolia, Ruiru 11, SL14, SL28, SL34, Starmaya, straminea, sundana, T5175, T5296, T8667, Tekisic, tupey, typica, variegate, Venecia, Villa Sarchi and combinations thereof.

9. The juice product of any of clauses 2 to 8, wherein the citrus fruit juice and/or organic acid comprises a pH modifier selected from the group comprising of orange juice, lemon juice, lime juice, clementine juice, citron juice, tangerine juice, malic acid, citric acid and combinations thereof.

10. The juice product of any of clauses 3 to 9, wherein the tropical fruit juice comprises an enzymatic oxidation modifier selected from the group comprising of acerola juice, acerola puree, ascorbic acid, citric acid, acetic acid and combinations thereof.

11. The juice product of clause 10, wherein the acerola is selected from the group comprising of B-17, Dwarf, Florida Sweet, Manoa Sweet, Beaumont, Haley, Hawaiian Queen, Maunawili, Red Jumbo, Rehnborg, Tropical Ruby and combinations thereof.

12. The juice product of any of clauses 1 to 11, wherein the juice product comprises juices that are not from concentrate.

13. The juice product of clause 12, wherein the juice product comprises a chlorogenic acid (CGA) content of about 350 mg/L to about 24,000 mg/L.

14. The juice product of clause 12, wherein the juice product comprises a chlorogenic acid (CGA) content of about 550 mg/L to about 24,000 mg/L or from about 350 mg/L to about 12,000 mg/L.

15. The juice product of clause 12, wherein the juice product comprises a caffeine content of about 160 mg/L to about 5,500 mg/L.

16. The juice product of clause 12, wherein the juice product comprises a caffeine content of about 250 mg/L to about 5,500 mg/L or about 160 mg/L to about 3,500 mg/L.

17. The juice product of any of clauses 1 to 11, wherein the juice product comprises juices that are from concentrate.

18. The juice product of clause 17, wherein the juice product comprises a chlorogenic acid (CGA) content of about 800 mg/L to about 96,000 mg/L.

19. The juice product of clause 17, wherein the juice product comprises a chlorogenic acid (CGA) content of about 1,200 mg/L to about 192,000 mg/L.

20. The juice product of clause 17, wherein the juice product comprises a caffeine content of about 350 mg/L to about 28,000 mg/L.

21. The juice product of clause 17, wherein the juice product comprises a caffeine content of about 625 mg/L to about 44,000 mg/L.

22. The juice product of any of clauses 1 to 16, wherein the juice product has a Brix value of about 7° to about 25°.

23. The juice product of any of clauses 1 to 11 and 17-22, wherein the juice product has a Brix value of about 20° to about 75°.

24. The juice product of any of clauses 1 to 23, wherein the coffee berry juice is from about 1% to about 100% of the juice product.

25. The juice product of any of clauses 2 to 24, wherein the citrus fruit juice and/or organic acid is from about 0% to about 50% of the juice product.

26. The juice product of any of clauses 3 to 24, wherein the tropical fruit juice is from about 0% to about 70% of the juice product.

27. The juice product of clause 26, wherein the tropical fruit juice is from about 2% to about 15% of the juice product.

28. The juice product of any of clauses 1-27, wherein the whole coffee berries are pre-treated with from about 0.5% to about 2% tropical fruit juice prior to forming the coffee berry juice.

29. The method of making a juice product, the method comprising:

a. providing a coffee berry, derived from a whole coffee berry; and
b. milling the coffee berry, thereby forming a juice product.

30. The method of clause 29, wherein the coffee berries are pre-treated with tropical fruit juice.

31. The method of clause 30, wherein the coffee berries are pre-treated with from about 0.5% to about 2% tropical fruit juice.

32. The method of any of clauses 29 to 31, wherein the juice product further comprises a citrus fruit juice and/or an organic acid.

33. The method of any of clauses 29 to 32, wherein the juice product further comprises a tropical fruit juice.

34. The method of any of clauses 29-33, further comprising adding the citrus fruit juice and/or organic acid from about 0% to about 50% and the tropical fruit juice from about 0% to about 70% of the juice product, prior to milling.

35. The method of any of clauses 29 to 33, further comprising adding citrus fruit juice and/or organic acid from about 0% to about 50% and tropical fruit juice from about 0% to about 70% of the juice product after the milling step.

36. The method of any of clauses 29, 34 or 35, further comprising heating the juice product at a temperature from about 100° F. to about 200° F., wherein the heating step increases the caffeine yield of the juice product by at least about 5%, more preferably about 10%.

37. The method of any of clauses 29-36, further comprising pressing the juice product.

38. The method of any of clauses 29-37, further comprising clarifying the juice product.

39. The method of any of clauses 37 to 38, further comprising heat pasteurizing the juice product.

40. The method of clause 39, further comprising the step of aseptically filling a container with the pasteurized juice product.

41. The method of any of clauses 29 to 38, further comprising aseptically filling a container with the juice product.

42. The method of any of clauses 29 to 41, wherein the juice product comprises juices that are not from concentrate.

43. The method of clause 42, wherein the juice product comprises a chlorogenic acid (CGA) with a content of about 350 mg/L to about 24,000 mg/L.

44. The method of clause 42, wherein the juice product comprises a chlorogenic acid (CGA) content of about 550 mg/L to about 24,000 mg/L, or of about 350 mg/L to about 12,000 mg/L.

45. The method of clause 42, wherein the juice product comprises a caffeine content of about 160 mg/L to about 5,500 mg/L.

46. The method of clause 42, wherein the juice product comprises a caffeine content of about 250 mg/L to about 5,500 mg/L, or about 160 mg/L to about 3,500 mg/L.

47. The method of clause 29 to 41, wherein the juice product comprises juices that are from concentrate.

48. The method of clause 47, wherein the juice product comprises a chlorogenic acid (CGA) content of about 800 mg/L to about 96,000 mg/L.

49. The method of clause 47, wherein the juice product comprises a chlorogenic acid (CGA) content of about 1,200 mg/L to about 192,000 mg/L.

50. The method of clause 47, wherein the juice product comprises a caffeine content of about 350 mg/L to about 28,000 mg/L.

51. The method of clause 47, wherein the juice product comprises a caffeine content of about 625 mg/L to about 44,000 mg/L.

52. The method of any of clauses 29-41, wherein the juice product comprises a caffeine concentration of about 160 mg/L to about 44,000 mg/L.

53. The method of any of clauses 29-41 and 52, wherein the juice product comprises one or more terpenes selected from a group comprising α-pinene, β-pinene, myrcene, limonene, γ-terpinene and combinations thereof.

What is claimed is:

1. A juice product comprising:

a whole coffee berry juice wherein the whole coffee berry is pretreated to reduce browning of the whole coffee berry, wherein the whole coffee berry juice is reduced to a pH at or less than 4.1 using citrus juice, tropical fruit juice, or a combination thereof before addition to a juice product, wherein the whole coffee berry juice has detectable amounts of α-pinene, β-Pinene, Myrcene, Limonene, and γ-Terpinene before addition to the juice product, wherein the juice product comprises a chlorogenic acid (CGA) content of about 350 mg/L to about 24,000 mg/L.

2. The juice product of claim 1, wherein the juice product further comprises a citrus fruit juice and/or an organic acid.

3. The juice product of claim 1, wherein the juice product further comprises a tropical fruit juice and/or an organic acid.

4. The juice product of claim 1, wherein the caffeine content in the juice product is from about 500 mg/L to about 7,000 mg/L.

5. The juice product of claim 1, wherein the coffee berry is selected from the group comprising of *Coffea Arabica* or derivative thereof, *Coffea canephora* or derivative thereof and combination thereof.

6. The juice product of claim 5, wherein the *Coffea canephora* coffee berry is selected from the group consisting of crassifolia, gossweileri, hiernii, hinaultii, kouilouensis, laurentii, maclaudii, muniensis, nganda, oligoneura, opaca, robusta, sankuruensis, stuhlmannii, trillesii, ugandae, welwitschii, wildemanii and combinations thereof.

7. The juice product of claim 5, wherein the *Coffea arabica* coffee berry is selected from the group consisting of acaqua, amarelle, Anacafe 14, angustifolia, Batian, Bourbon Mayaguez 139, Bourbon Mayaguez 71, bourbon, brevistipulata, bullata, Casiopea, Catimor 129, catimor, Catisic, Catuai, catuey, caturra, Centroamericano, columnaris, Costa Rica 95, Cuscatleco, erecta, Evaluna, Fronton, Geisha (Panama), H3, Harrar Rwanda, IAPAR 59, Ihcafe 90, Jackson 2/1257, Java, K7, KP423, lempira, Limani, lobata, longistipulata, Maragogipe, Marsellesa, Mibiriza, Milenio, Mokka, monosperma, Mundo Maya, Mundo Novo, murta Laliere pendula, Nayarita, Nemaya, Nyasaland, Obata Rojo, Oro Azteca, Pacamara, Pacas, Pache, Parainema, polysperma, Pop3303/21, pubescens, purpurascens, RAB C15, rotundifolia, Ruiru 11, SL14, SL28, SL34, Starmava, straminea, sundana, T5175, T5296, T8667, Tekisic, tupey, typica, variegate, Venecia, Villa Sarchi and combinations thereof.

8. The juice product of claim 2, wherein the citrus fruit juice and/or organic acid comprises a pH modifier.

9. The juice product of claim 3, wherein the tropical fruit juice and/or an organic acid comprises an enzymatic oxidation modifier.

10. The juice product of claim 9, wherein the tropical fruit juice is acerola, wherein the acerola is selected from the group consisting of B-17, Dwarf, Florida Sweet, Manoa Sweet, Beaumont, Haley, Hawaiian Queen, Maunawili, Red Jumbo, Rehnborg, Tropical Ruby and combinations thereof.

11. The juice product of claim 1, wherein the juice product comprises a caffeine content of about 160 mg/L to about 5,500 mg/L.

12. The juice product of claim 1, wherein the juice product has a Brix value of about 7° to about 25°.

* * * * *